US010252777B2

(12) United States Patent
Hardcastle

(10) Patent No.: US 10,252,777 B2
(45) Date of Patent: Apr. 9, 2019

(54) CONTROLLABLE FLOAT MODULE, A MODULAR OFFSHORE STRUCTURE ASSEMBLY COMPRISING AT LEAST ONE CONTROLLABLE FLOAT MODULE AND A METHOD FOR ASSEMBLING A MODULAR OFFSHORE STRUCTURE IN SITU

(71) Applicant: Trevor M. Hardcastle, Northumberland (GB)

(72) Inventor: Trevor M. Hardcastle, Northumberland (GB)

(73) Assignee: Trevor M. Hardcastle, Northumberland (GB)

( * ) Notice: Subject to any disclaimer, the term of this patent is extended or adjusted under 35 U.S.C. 154(b) by 0 days.

(21) Appl. No.: 15/768,390

(22) PCT Filed: Dec. 19, 2016

(86) PCT No.: PCT/GB2016/053990
§ 371 (c)(1),
(2) Date: Apr. 13, 2018

(87) PCT Pub. No.: WO2017/109470
PCT Pub. Date: Jun. 24, 2017

(65) Prior Publication Data
US 2018/0304970 A1    Oct. 25, 2018

(30) Foreign Application Priority Data

Dec. 20, 2015    (GB) .................................. 1522480.1

(51) Int. Cl.
*B63B 35/44*    (2006.01)
*B63B 9/06*    (2006.01)
*B63B 39/03*    (2006.01)

(52) U.S. Cl.
CPC .............. *B63B 9/065* (2013.01); *B63B 35/44* (2013.01); *B63B 39/03* (2013.01); *B63B 2009/067* (2013.01); *B63B 2035/446* (2013.01)

(58) Field of Classification Search
CPC ....... B63B 9/00; B63B 9/065; B63B 2009/00; B63B 2009/065; B63B 2009/067; B63B 35/44; B63B 2035/446; B63B 39/03
(Continued)

(56) References Cited

U.S. PATENT DOCUMENTS

| | | | | |
|---|---|---|---|---|
| 3,276,209 A | * | 10/1966 | Mosdell .................. | B63B 35/38 114/266 |
| 3,659,540 A | * | 5/1972 | Toby ....................... | B63B 35/34 114/266 |
| 3,974,789 A | * | 8/1976 | de Groot .................. | B63B 5/18 114/256 |
| 4,275,679 A | * | 6/1981 | Finsterwalder ..... | B63B 35/4413 114/264 |

(Continued)

FOREIGN PATENT DOCUMENTS

| WO | WO 00/40806 | 7/2000 |
|---|---|---|
| WO | 2014/125001 | 8/2014 |
| WO | 2014/195579 | 12/2014 |

OTHER PUBLICATIONS

International Search Report and Written Opinion for international application No. PCT/GB2016/053990 dated Feb. 28, 2017.
(Continued)

*Primary Examiner* — Daniel V Venne
(74) *Attorney, Agent, or Firm* — Workman Nydegger

(57) ABSTRACT

The present invention provides a controllable float module for a modular offshore support structure assembly. The inventive float module comprises (i) a first ballast chamber provided within a predetermined first portion of said float module, having at least one first controllable fluid connection, adapted to provide controlled fluid flow between an interior of said first ballast chamber and a first fluid reservoir containing a first fluid, and at least one second fluid connection, adapted to provide controlled fluid flow between
(Continued)

said interior of said first ballast chamber and a second fluid reservoir containing a second fluid; (ii) at least one second ballast chamber provided within a predetermined second portion of said float module, having at least one first controllable fluid connection, adapted to provide controlled fluid flow between an interior of said second ballast chamber and said first fluid reservoir containing said first fluid, and at least one second fluid connection, adapted to provide controlled fluid flow between said interior of said second ballast chamber and said second fluid reservoir containing said second fluid, and (iii) a control system, adapted to control each of said at least one first and second controllable fluid connection and selectively vary the proportional quantity of said first fluid and said second fluid within any one of said first and at least one second ballast chamber, so as to selectively vary the buoyancy of any one of said at least one predetermined first and second portion of said float module when in use.

23 Claims, 18 Drawing Sheets

(58) Field of Classification Search
USPC .................................................. 114/266, 267
See application file for complete search history.

(56) References Cited

U.S. PATENT DOCUMENTS

| 7,281,483 | B1 | 10/2007 | Horton, III |
| 2004/0050315 | A1 | 3/2004 | Persson |
| 2004/0253060 | A1 | 12/2004 | Horton |

OTHER PUBLICATIONS

International Preliminary Report on Patentability for international application No. PCT/GB2016/053990 dated Feb. 26, 2018.
Great Britain Search Report for application No. GB1522480.1 date of search Dec. 16, 2016.

* cited by examiner

CONTROLLABLE FLOAT MODULE, A MODULAR OFFSHORE STRUCTURE ASSEMBLY COMPRISING AT LEAST ONE CONTROLLABLE FLOAT MODULE AND A METHOD FOR ASSEMBLING A MODULAR OFFSHORE STRUCTURE IN SITU

The present invention generally relates to offshore floating support structures, and in particular to a modular floating structure that is assemblable at the location of operation either manually or via remote control.

INTRODUCTION

Requirement for Renewable Energy:

The need for renewable electrical energy generation to substitute fossil-fuelled generation is a challenge now faced by almost two-hundred nations following the United Nations led Global Climate summit held in Paris in December 2015. A pact was declared as 'adopted' by the nations by the French Foreign Minister Laurent Fabius on 11 Dec. 2015. The pact agreed is to meet the target of no more than 1.5° C. (degrees centigrade) temperature rise, previously 2° C., and consequently there is a need to more swiftly introduce significant capacity of renewable energy generation.

Offshore Wind Power Generation:

Offshore wind power generation has been identified as a viable solution to eliminate carbon dioxide emissions production during power generation. Unlike conventional fossil-fuelled and nuclear-fuelled power generation the 'power density' of offshore wind generation is considerably lower and for higher efficiencies needs to be located carefully to optimise energy conversion efficiencies and also enable practical operation and maintenance of electrical generating, and power conditioning equipment. Multiple generators located at different locations provides mass manufacturing opportunities, and these are well established for the production of wind turbines that are manufactured in modern factories, utilising best practice production methods adapted from sector outside of the renewable energy sector. One example is the adoption of manufacturing techniques and systems from the automotive sector reducing waste and improving product consistency and quality.

This approach keeps costs down and has created a competitive trading environment. Offshore wind is now a proven technology to create renewable energy, however, there are significant technical and economical constraints when using 'fixed' support structures upon which the turbine is mounted. The support structures based on designs known such as 'Monopiles', 'Lattice' or 'Jackets', and 'Gravity-based' structures all have limitations to where they can be located depending on water depth, tidal current conditions and seabed soil conditions. These designs will create new, and to date unsolved, problems for decommissioning at end of operational life.

Floating Offshore Wind Power:

Floating offshore wind energy generation offers an alternative solution and can be deployed in an extensive range of locations and in particularly where conditions are unsuitable for 'fixed' structures.

It is understood that various floating wind concepts are being developed in the many countries and communities, such as, for example, USA, France, Netherlands, Spain, Germany, UK, Japan, Norway, Sweden, Denmark and the European Union. However, the problem with floating wind concepts, and the subsequent slow development, is that they require very wide beam, long and deep, floodable construction yards, or slipways. The design of such traditional construction facilities, which were mostly created for offshore oil and gas development in the late 1960's to 1970's, place major constraints on the ability to mass-produce and deploy suitable floating structures. These disadvantageous constraints are caused, for example, by (i) the need for complex sub assembly fabrication, (ii) the need for the use of heavy lift cranes, (iii) the need for complex welding operations by persons, (iv) the need for specialised inspections by persons, (v) the need for completing or nearly-completing the entire floating structure before flooding of the construction dock, or launch from a slipway, (vi) the need for precise timing of flooding of construction docks or slipway launching to ensure sufficient water depth for the procedure to be effectively carried out, (vii) the consideration of the state of build of other floating structures that could be affected by the flooding of the dock, and consequential stoppage of production on other part-built floating structures, (viii) the limitation of production output by dock and slipway design, and skilled persons availability at particular times during construction, (viiii) the severe limitation on the ability of the construction process to be automated, (x) the effect that weather and sea state conditions has on construction including use of heavy lift cranes, open air welding, tow-out of a floating structure, and (xi) the cost of construction using a traditional 'on-off' approach was viable for oil & gas with swift return on investment due to high value product of oil or gas, however the economics of offshore wind require long periods for return on investment and government subsidies.

Accordingly, it is an object of the present invention to provide a controllable float module that is modular and assemblable into an offshore support structure assembly, so as to overcome the current problems, and obviate the need for large construction facilities. In particular, is it an object of the present invention to provide a modular support structure assembly that allows manufacture of remotely assemblable component modules in a manufacturing plant, with the transportation of the modules to waterside location, and the loading of modules into the river or marine quayside location. Even more particular, it is an object of the present invention to provide a modular support structure assembly that allows the final assembly of the modules to be carried out offshore, yet near the coast to enable local workforce availability, and wherein the final assembly of the floating structure can be completed whilst fully or partly submerged in the water.

SUMMARY OF THE INVENTION

Preferred embodiment(s) of the invention seek to overcome one or more of the disadvantages of the prior art.

According to a first embodiment of the invention, there is provided a controllable float module for a modular offshore support structure assembly, comprising:

a first ballast chamber provided within a predetermined first portion of said float module, having at least one first controllable fluid connection, adapted to provide controlled fluid flow between an interior of said first ballast chamber and a first fluid reservoir containing a first fluid, and at least one second fluid connection, adapted to provide controlled fluid flow between said interior of said first ballast chamber and a second fluid reservoir containing a second fluid;

at least one second ballast chamber provided within a predetermined second portion of said float module, having at least one first controllable fluid connection, adapted to provide controlled fluid flow between an interior of said second ballast chamber and said first fluid reservoir containing said first fluid, and at least one second fluid connection, adapted to provide controlled fluid flow between said interior of said second ballast chamber and said second fluid reservoir containing said second fluid;

a control system, adapted to control each of said at least one first and second controllable fluid connection and selectively vary the proportional quantity of said first fluid and said second fluid within any one of said first and at least one second ballast chamber, so as to selectively vary the buoyancy of any one of said at least one predetermined first and second portion of said float module when in use.

The invention enables the use of existing Intermodal Containerised Freight Transport with conventional road, rail, ship transport systems, conventional mobile cranes and a basic hard stand quayside with moderate water depths. Furthermore, the invention enables production to continue in a very wide range of weather conditions because of production of modules in indoor manufacturing plant conditions. And assembly carried out in submerged conditions to water depths below which where surface waves do not affect movement of components and sub-assembly connection and construction. Currently this is not the case with other forms of floating structure constructed in large floodable docks. The tidal and weather conditions have a significant impact on production planning and production rate.

In particular, the alignment of modules of sub-assemblies to be connected, and the physical connection is intended to be carried out remotely (e.g. utilising a Virtual Reality control system or an Augmented Reality control system), for example, from a conventional offshore supply vessel for safe, repeatable, and reliable connections to be made without the need for divers. In particular, a vessel such as a tug, or an offshore supply vessel, or an anchor handling vessel could carryout these functions. It is understood that any suitable transport means may be used to get the float modules from the ISO container to the offshore assembly location.

The addition of the wind turbine is made by changing the buoyancy of the floating structure to take advantage of the 'semi-submersible' design, which can be de-ballasted allowing a very shallow draft. This feature allows the floating structure to be towed back to a quayside where conventional mobile heavy lift crane can assemble the wind turbine tower sections, nacelle, rotor and blades onto the floating structure. This obviates the need for a floating offshore heavy lift crane barge or crane ship, which have very high day rate charges and low availability and the requirement of specialised lifting crews. The limited availability of these very high cost cranes (e.g. barge, ships) is currently causing limitations for offshore wind farm construction and major maintenance operations leading to wind farms operating at lower output rates awaiting availability and suitable 'weather windows'.

Advantageously, the controllable float module may further comprise a fluid-tight first container configured to encase said first and at least one second ballast chamber. Preferably, said fluid-tight container may be made of a buoyant material. Even more preferably, said container may comprise at least one connector mechanism, adapted to operatively couple said float module to at least one other float module.

Advantageously, each of said at least one first controllable fluid connection may comprise a first fluid port mechanism, operatively coupled to respective one of said first and at least one second ballast chamber, and adapted to maintain a predetermined first orientation with respect to the gravitational field of the earth irrespective of the orientation of said float module.

Advantageously, each of said at least one second controllable fluid connection may comprise a second fluid port mechanism, operatively coupled to respective one of said first and said at least one second ballast chamber, and adapted to maintain a predetermined second orientation with respect to the gravitational field of the earth irrespective of the orientation of said float module.

Preferably, each one of said at least one first controllable fluid connection and said at least one second controllable fluid connection may comprise any one or any number of at least one control valve, at least one fluid pump, at least one vent and at least one fluid filter, each actuatable by said control system.

Advantageously, said first ballast chamber and said at least one second ballast chamber may be fluidly coupleable, so as to allow selective fluid exchange between said first ballast chamber and any one of said at least one second ballast chamber.

Preferably, the controllable float module may comprise a plurality of said first and/or at least one second ballast chamber, each provided within a predetermined portion of said float module.

Advantageously, the controllable float module may further comprise at least one sensor operatively coupled to said float module and adapted to detect and/or monitor at least one physical property of said float module.

Advantageously, any one of said first and said second fluid reservoir may be located exterior to said float module. Alternatively, any one of said first and said second fluid reservoir may be an integral part of said float module.

Advantageously, said control system may be adapted to receive and transmit at least one control signal adapted to affect said float module into at least one first position and/or orientation when in use. Preferably, said control system is adapted to receive and transmit wireless control signals. Even more preferably, said at least one control signal may be any one of an electrical signal, a pneumatic signal, a hydraulic signal, an optical signal, an electromagnetic wireless signal and a sonic signal.

Advantageously, the density of said first fluid may be higher than the density of said second fluid. Preferably, said first fluid may be a liquid and said second fluid may be a gas. Even more preferably, said second fluid may be a pressurised gas. In particular, the seawater may simply be used to ballast the ballast chambers (i.e. simply pumped into the chambers).

Advantageously, the controllable float module may further comprise a power source adapted to supply power to said float module. Advantageously, said power source may be an external power supply operatively coupleable to said float module. Alternatively, said power source may be an energy storage system operatively coupled to said float module.

According to a second embodiment of the invention, there is provided a modular offshore support structure assembly, comprising at least one controllable float module according to the first embodiment of the present invention. Preferably, the modular offshore support structure may comprise a plurality of said float modules adapted be assembled into a plurality of predetermined shapes.

Advantageously, the modular offshore support structure assembly may further comprise a user interface adapted to provide remote assembly of said modular offshore support structure assembly.

According to a third embodiment of the invention, there is provided a method for assembling a modular offshore support structure according to the second embodiment of the present invention, comprising the steps of:
(a) moving a plurality of modular float modules to a predetermined offshore location;
(b) varying buoyancy characteristics of at least a portion of any one of said plurality of modular float modules so as to move any one of said plurality of modular float modules into a desired position and/or orientation;
(c) operatively couple any one of said plurality of modular float modules to any other one of said plurality of modular float modules.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

Figure 1:
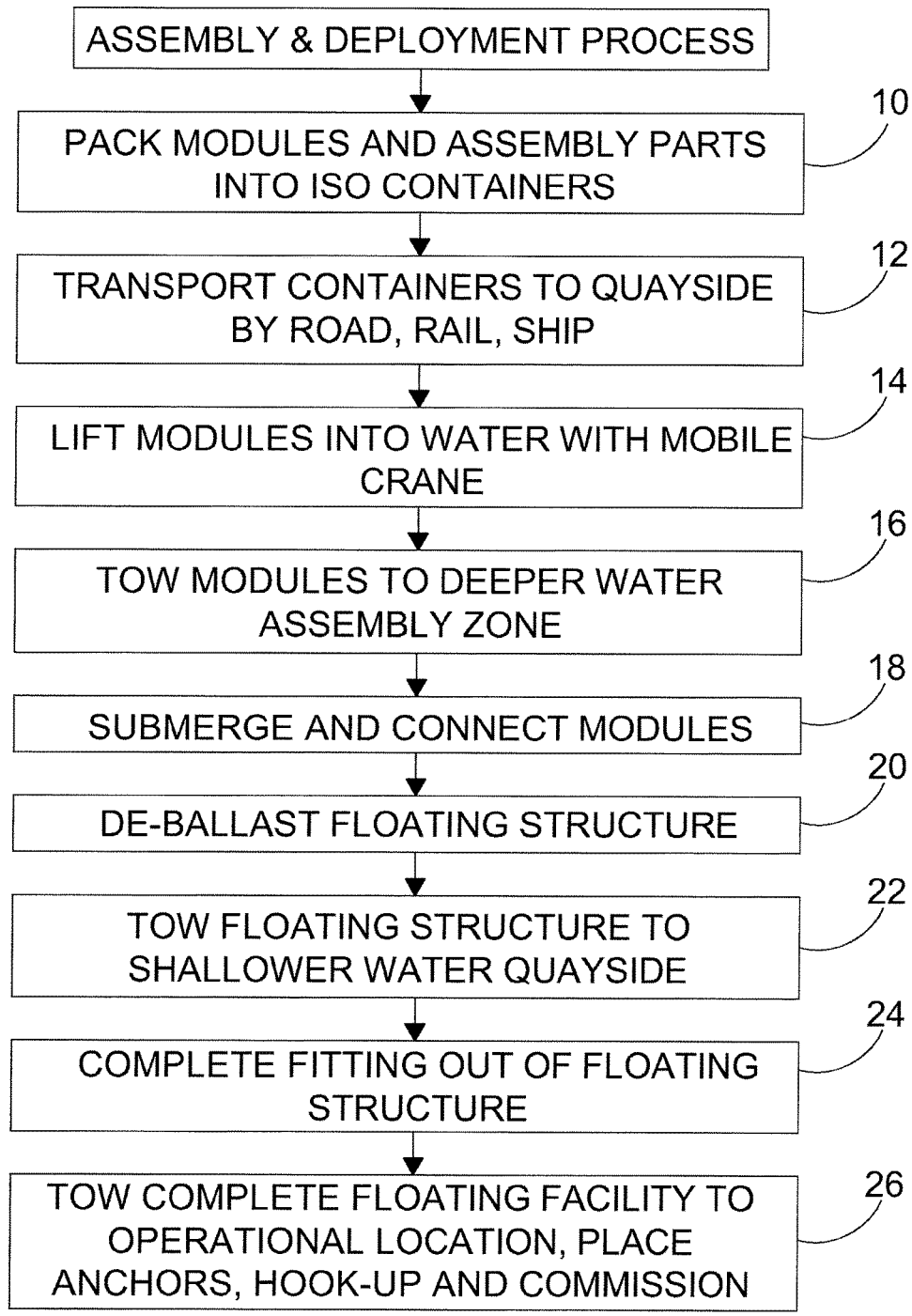
FIG. 1 shows a flow chart of the method steps required to assemble and deploy the modular support structure assembly of the present invention.

The exemplary embodiments of this invention will be described in relation to an offshore support structure for an offshore wind farm that is suitable for intermodal containerised freight transport. However, it is understood by a person skilled in the art that the controllable float module and/or modular offshore support structure assembly may equally be applicable to any other suitable offshore structure and/or equipment.

The invention is a Modular floating support structure 200 suitable for Intermodal Containerised Transport, that obviates or eliminates the requirement to use a floodable dock, slipway or similar facility normally necessary for construction of a floating support structure. In particular, the invention consists of one or more controllable float modules 100 that are assemblable to form the floating support structure 200. The controllable float modules 100 can be manufactured in a centralised plant or in a number of plants, but not necessarily at a coastal or riverside location. The assembly process may be conducted via remote control operation with the controllable float modules submerged in deep water, and does not require the use of divers.

Any one of the controllable float modules 100 can be connected to other float modules 100 and incorporate integral services, systems and equipment that are used during the assembly process.

The step of assembling the floating support structure 200 underwater and below the effects of the waves, provides a simple solution to the low productivity rates and 'bottleneck' and high production costs when using conventional ship and oil & gas construction facilities.

Integrating complex passageways and features, providing long-term corrosion resistance and exhibiting strength and durability properties for offshore use, requires a very specialised material manufacturing approach. Therefore, embodiments of the present invention may be realised by the use of low-temperature polymer mouldings, thus also enables viable end-of-life material recycling. The size of the mouldings is prohibitive for high-pressure injection moulding techniques and considered impractical for metal casting and fabrication by welding. A manufacturing method known as 'Reaction Injection Moulding' may be required to be used. However some assembly pieces and specific parts of some embodiments of the invention may use other materials, including, for example, steel, iron, concrete, fibre reinforced composites, and wood.

A controllable float module 100 may incorporate features that enable the adjustment of buoyancy, physical orientation and position of its centre of mass. These features are required to be used during the underwater assembly (see FIG. 1), but also during the operational generation of electricity. The features enable the changing of the centre of gravity, the mass, and the meta-centric height of individual controllable float modules 100, but also of the entire floating support structure 200, thus, enabling a wind turbine generator 300 to be maintained in operational orientation during varying wind conditions, as variable overturning moments are imparted upon the floating support structure 200. Integral ballast tanks 102 (or ballast chambers) and digital control of ballasting individual ballast chambers 102 through specific computer software (e.g. via a control system) optimises electricity generation. The Semi-submersible characteristics of the floating support structure 300 of the present invention allows operation in heavy sea conditions due to the relative 'transparency' to waves and swell.

The modular characteristics allows for the floating support structure 300 to be assembled globally, including in high-altitude lake locations, by simply utilising conventional road, rail and shipping infrastructures.

The control of the buoyancy and orientation of individual float modules 100 or groups of coupled float modules 100 may be effected by the admission and extraction of different density fluids (e.g. water and gas) within integral spaces (i.e. ballast chambers 102) in the float modules 100, for example, connected by pipes, tubes or communication ducts. The float modules 100 incorporate actuator components, such as, for example, control valves, actuators, filters and vents, so as to enable selective and remote control of the buoyancy and centre of mass of predetermined sections of the float module 100.

During the assembly of the floating support structure 200, temporary or permanent externally or internally mounted fixed or movable solid masses may be utilised to optimise production rates and operational performance.

Ballasting fluid(s) (e.g. water, gas) may be provided via external flowlines, for example, from a tug 400 or surface vessel, or may be provided from submerged tanks, receivers, or other vessels that are adjacent to, or integral with, the floating support structure 200, as it is being assembled. The tanks, receivers or vessels may also be connected by lines and control cables in the vicinity of the floating support structure 200, as it is being assembled.

It is understood that any controllable float module 100 can be coupled to any other controllable float module 100 with the assistance of cables, ropes, lines or with a tensioning or latching type feature. Furthermore, the controllable float module 100 may have fluid flow connections with features adapted to provide fluid sealing for communication of fluids into, between and from any of the controllable float modules 100. In addition, the float module 100 may have sensors, electronic controls and energy storage features that are incorporated so as to allow control and monitoring of the current conditions of and within the controllable float module 100. As mentioned earlier, the controllable float module 100 may also incorporate permanently fixed solid ballast.

Figure 2:
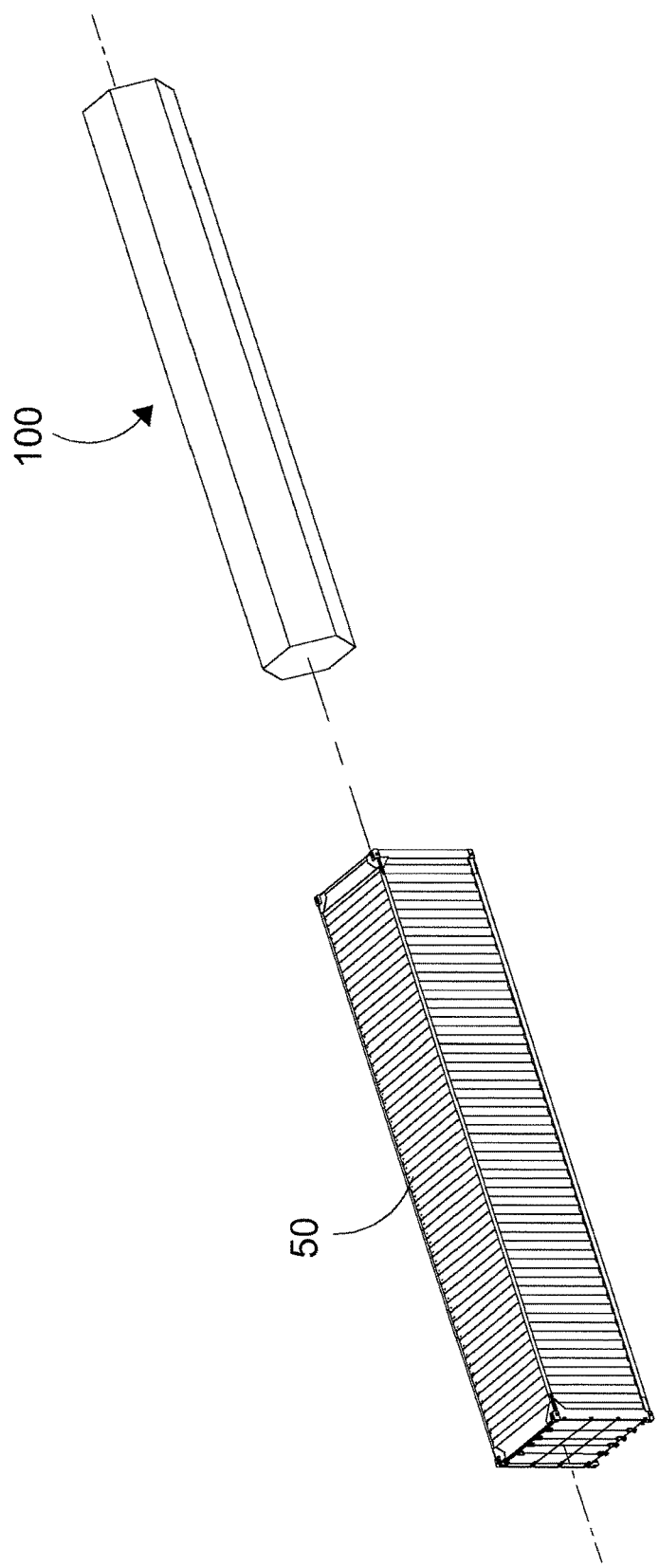
FIG. 2 shows an example embodiment of the controllable float module and a suitable ISO container following delivery by Intermodal Containerised Freight Transport to a Quayside.

Referring now to FIGS. 1 and 2, a simplified flow chart of the method steps of assembling and deploying the modular support structure 200 is illustrated. In particular, the method includes the step 10—packing the float modules 100 and other assembly parts (not shown) into suitable ISO containers 50, step 12—transporting the containers 50 to a quayside either by road, rail or ship (or even air); step 14—lifting the float modules 100 into the water (e.g. sea or lake) with a mobile crane 60; step 16—towing the float modules 100 to a deeper water assembly zone; step 18 submerging one or more float modules 100 by controlling its buoyancy characteristics and connecting the float modules utilising a remote control; step 20—de-ballasting (i.e. increasing the buoyancy) of the floating support structure 200; step 22—towing the floating support structure 200 to a shallower quayside; step 24—completing the fitting out of the floating support structure 200 (e.g. installing a wind turbine generator 300, and step 26—towing the completed floating support structure 200 and attached wind turbine generator 300 to an operational location, place an anchor, hook-up the support structure and commission.

Figure 3:
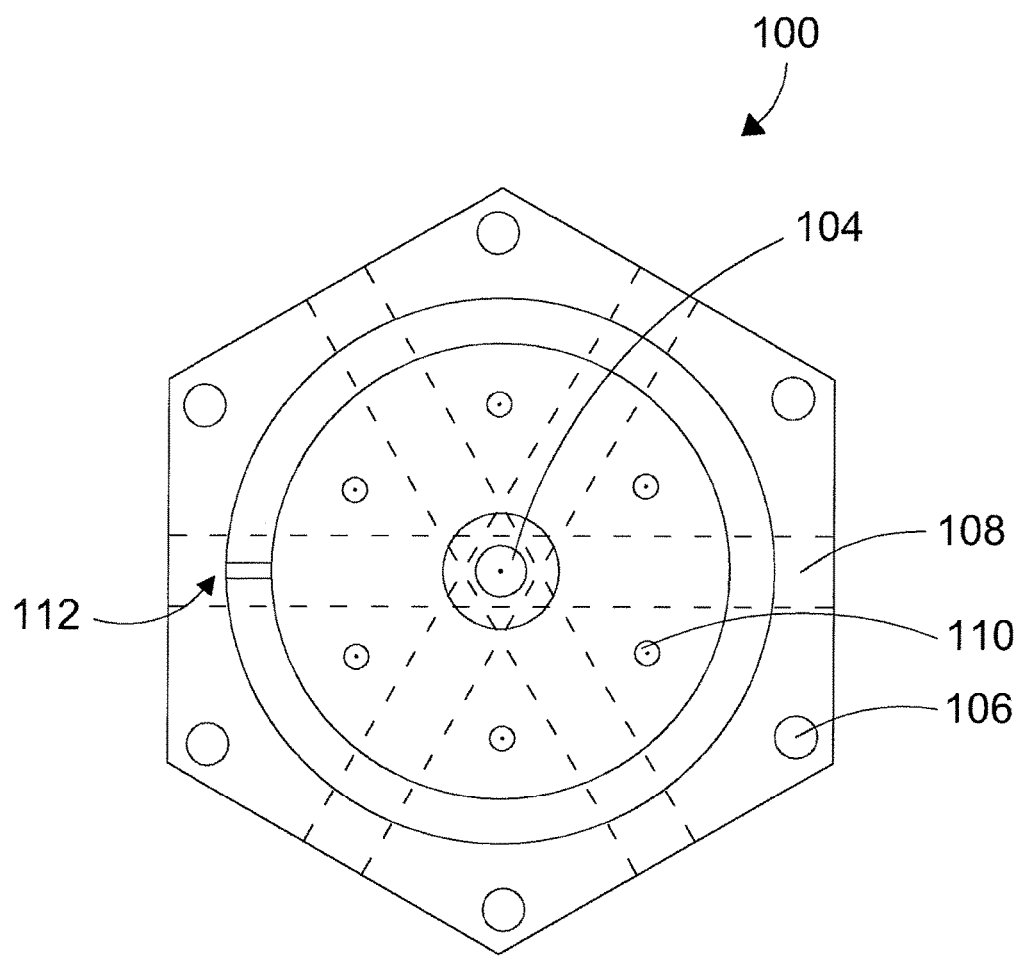
FIG. 3 shows a front view of the controllable float module shown in FIG. 2 including hidden integral passages (dashed lines)
Figure 4:
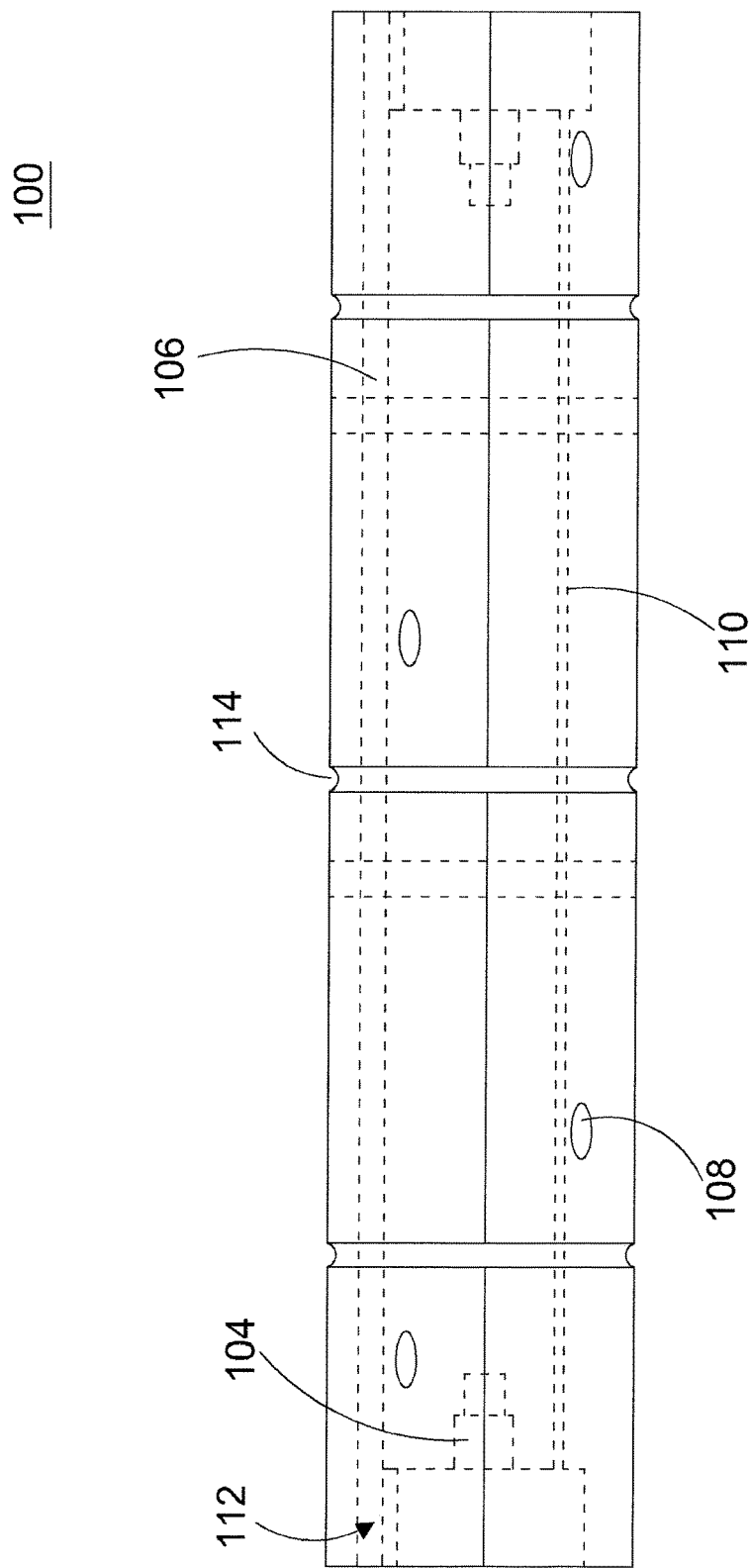
FIG. 4 shows a side view of the controllable float module shown in FIG. 2 including hidden integral passages (dashed lines)

Referring now to FIGS. 3 and 4, a front or rear end view of the float module 100 is shown, as well as, any hidden integral passages 106, 108, 110, which may be adapted to receive suitable assembly pieces, such as, for example, tensioning cables, fluid supply and discharge mains, electrical and electronic services and other equipment. A feature 104 may be included to assist in the longitudinal alignment of the float modules 100 during assembly. A feature 112 may be included that enables the float modules 100 to rotationally self-align to another module during assembly by, for instance, using towing or assembly lines. As illustrated in FIG. 4, a side elevation of a the float module 100 is illustrated, including the integral passages 106, 108 110, adapted to receive assembly pieces, such as, for example, tensioning cables, fluid supply and discharge mains, electrical and electronic services and other equipment. To enable the location of, for example, external ropes, lines or straps, a number of grooves 114 are formed on the outer surface of the float module 100.

Figure 5:
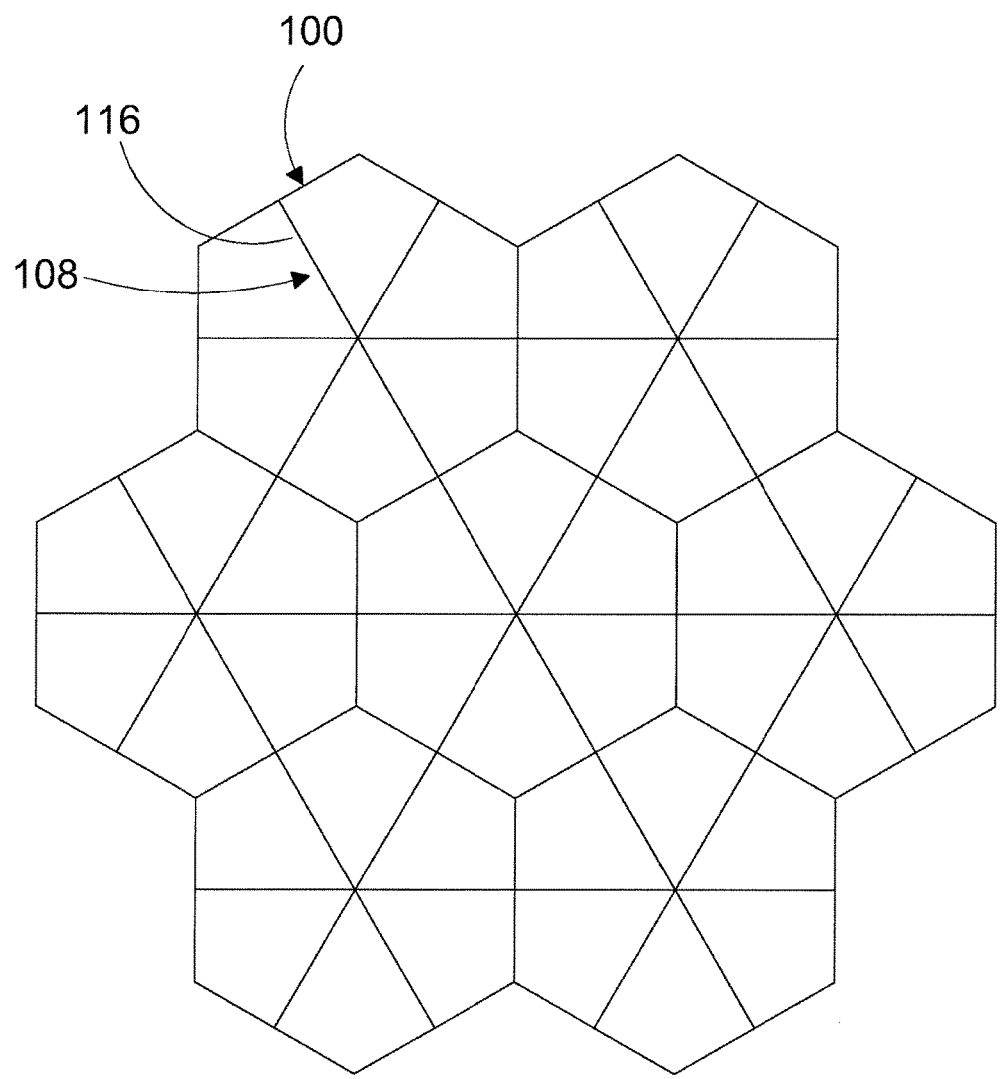
FIG. 5 shows an example of a plurality of controllable float modules coupled to each other utilising tensioned fasteners through respective integral passages.
Figure 6:
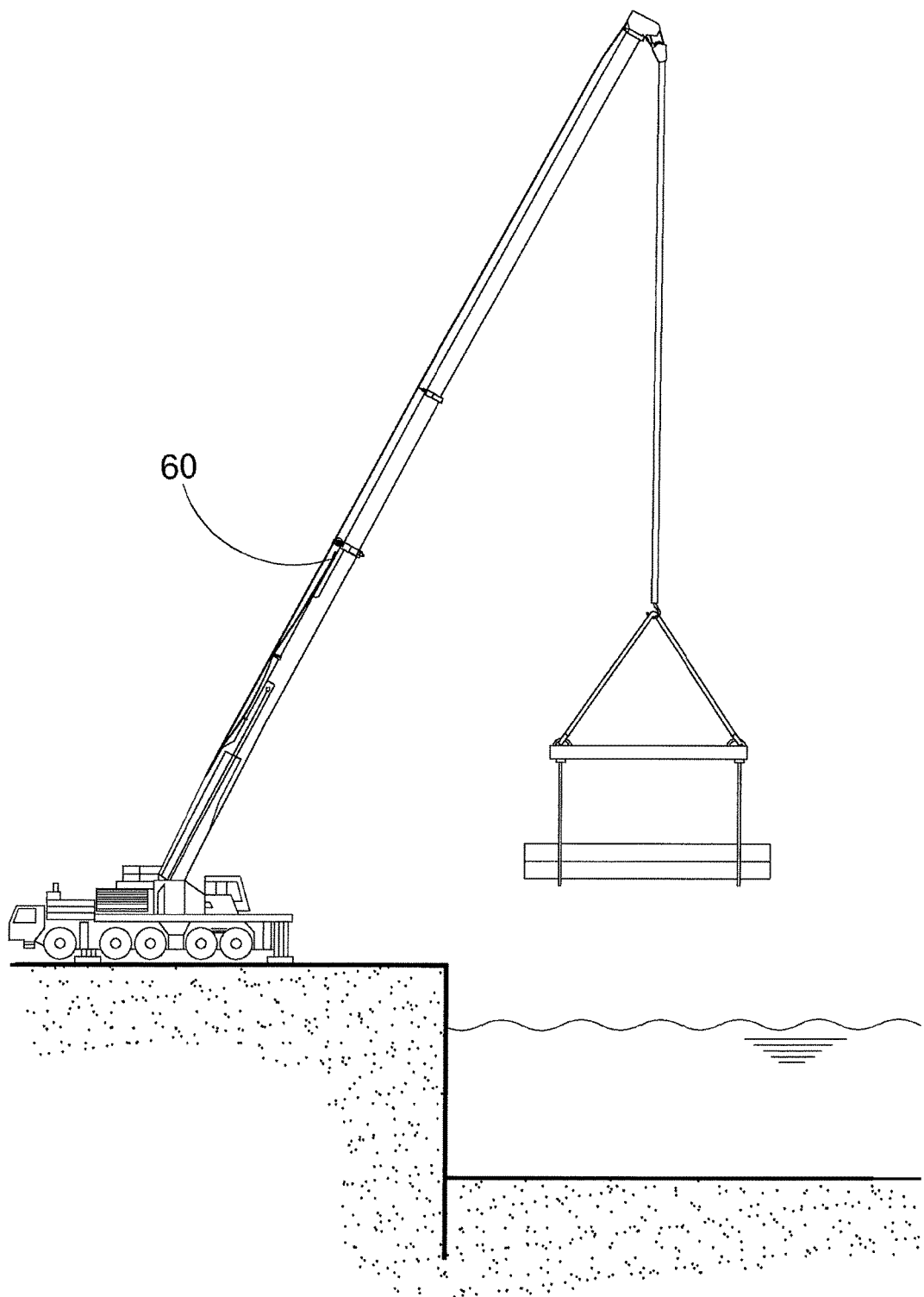
FIG. 6 shows a controllable float module being lifted by a mobile crane.
Figure 7:
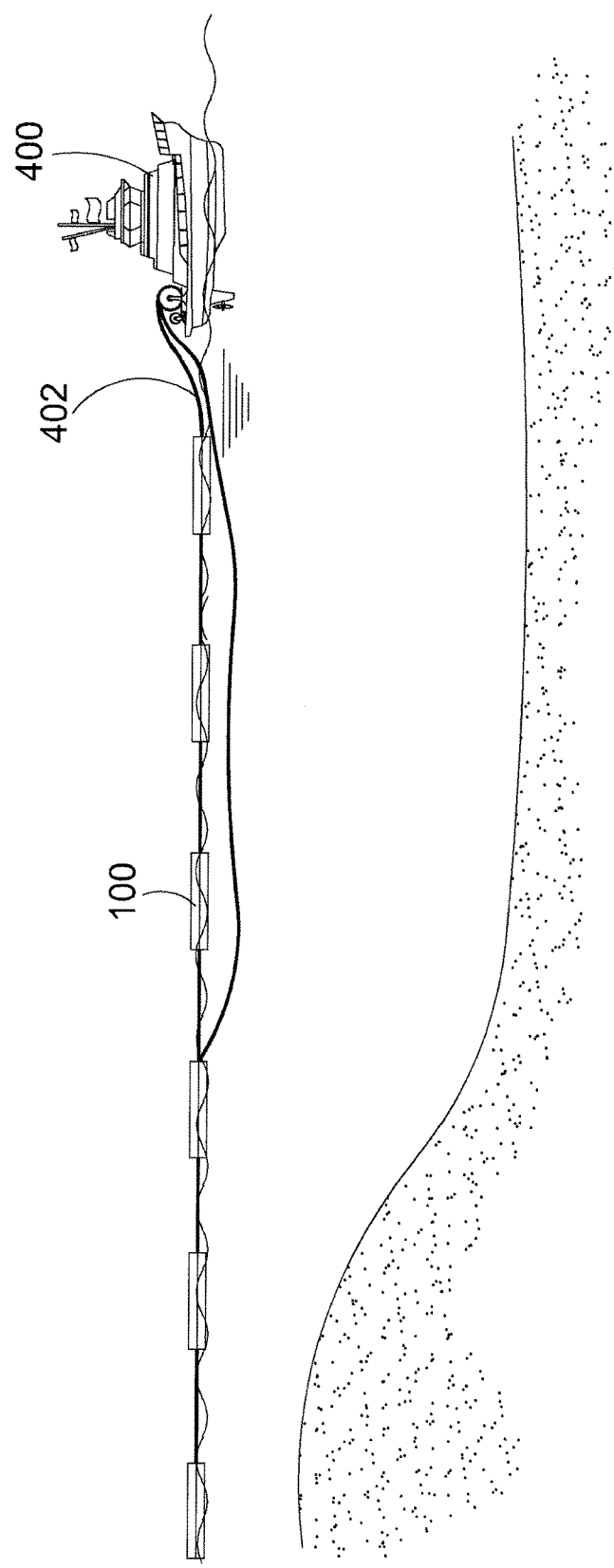
FIG. 7 shows a plurality of 'tethered' controllable float modules floating on the water surface and towed by a tug.

As shown in FIG. 5, a number of controllable float modules 100 is coupled together transversely with tensioned fasteners 116 that are fitted into passages 108. The tensioned fasteners may be suitable cables, rods, ropes or threaded bolts. FIG. 6 illustrates step 14, where controllable float modules 100 are lifted by a mobile crane 60 onto a water surface at a Quayside location. Normally, the controllable float modules 100 will be prepared beforehand so as to ensure that the float modules 100 have a buoyant characteristic that allows them to float on the water surface.

Figure 8:
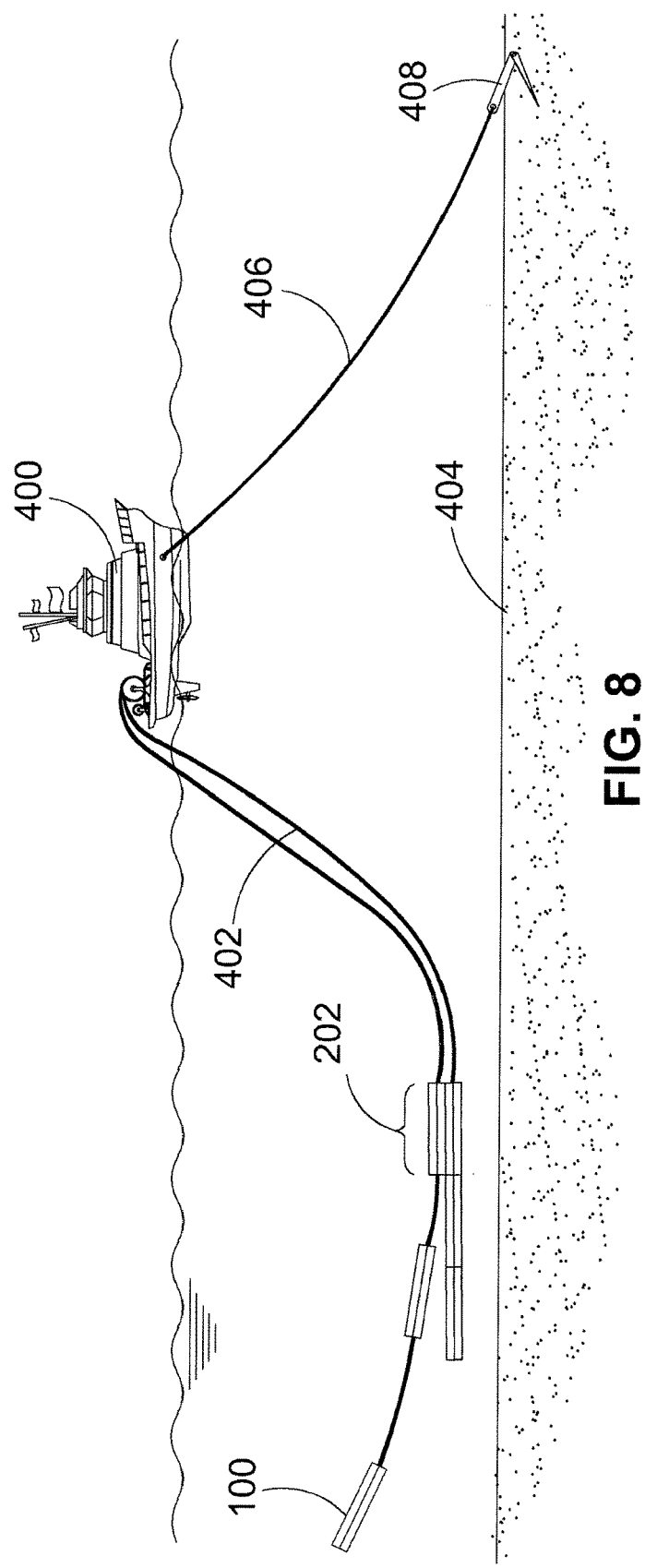
FIG. 8 shows the plurality of controllable float modules in FIG. 7 that are assembled underwater in a neutral buoyance state.
Figure 9:
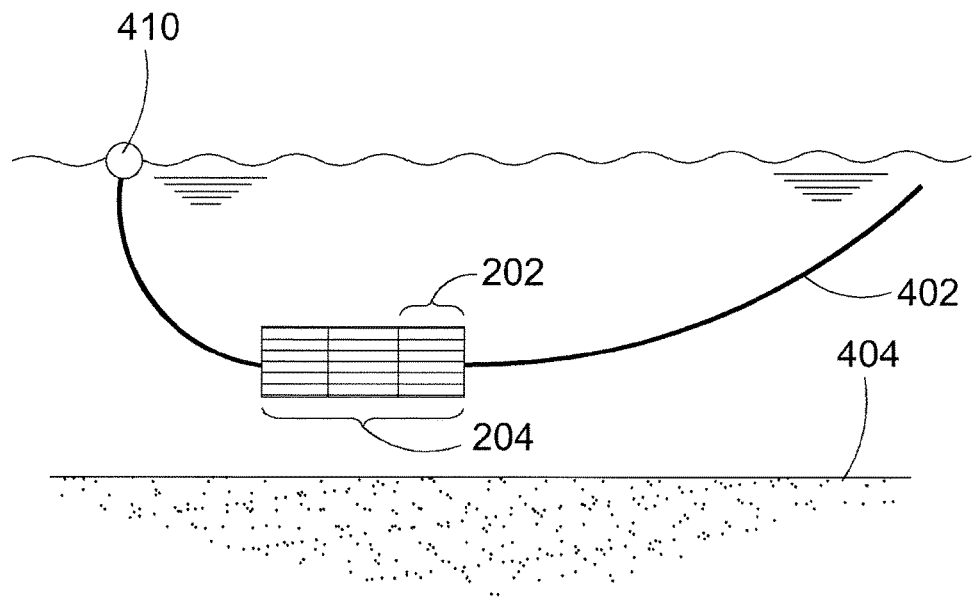
FIG. 9 shows an illustration of a group of minor sub-assemblies connected together so as to form a major sub-assembly.
Figure 10:
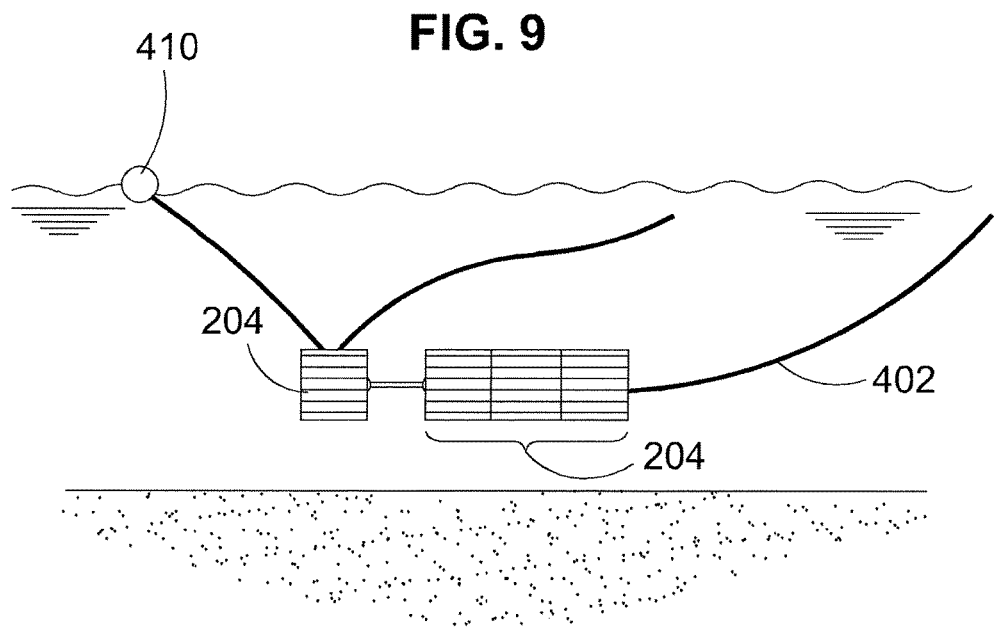
FIG. 10 shows an illustration of the connection of two major sub-assemblies under neutral buoyancy condition, with support lines connected to a buoy and a tug.
Figure 11:
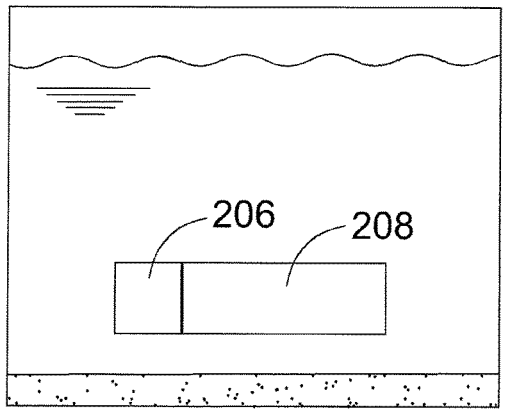
FIG. 11 shows an illustration of a column and node that are formed by the major sub-assemblies of FIG. 10.
Figure 12:
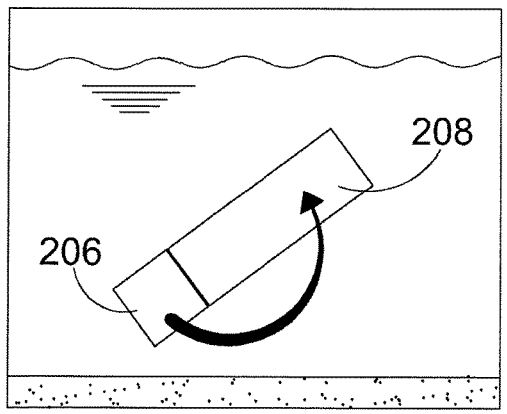
FIG. 12 shows the column and node of FIG. 11 being ballasted so as to move into an upright position.
Figure 13:
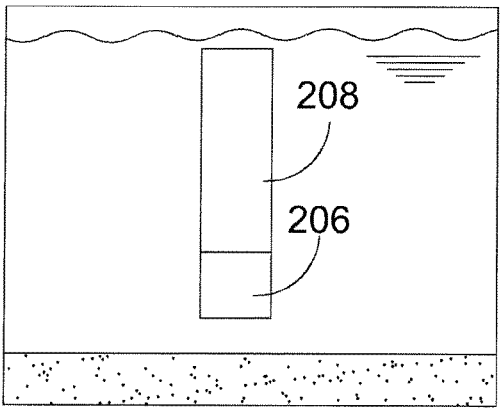
FIG. 13 shows the column and node of FIG. 11 in an upright orientation under neutral buoyancy condition.
Figure 14:
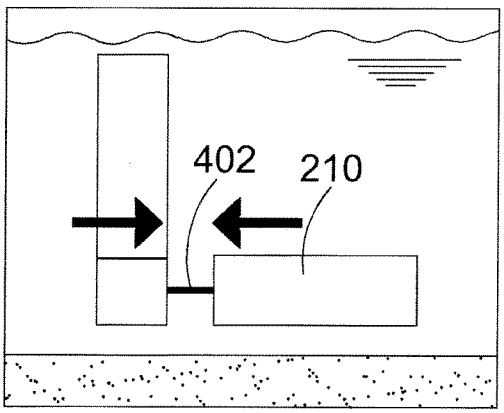
FIG. 14 shows a link member being connected to the node of the column of FIG. 11.
Figure 15:
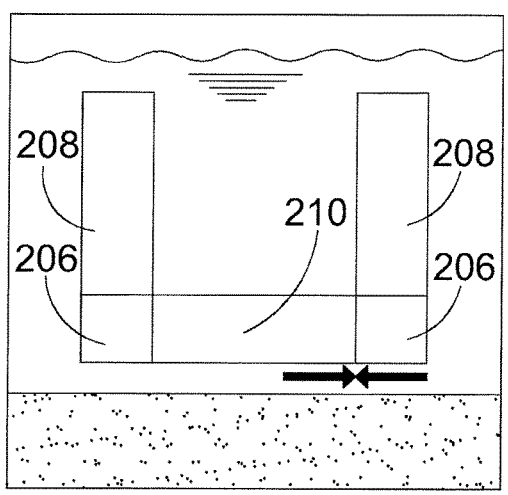
FIG. 15 shows another column, equivalent to the column of FIG. 11, being connected to the link member under neutral buoyancy condition.

Referring now to FIGS. 7, 8, 9 and 10, a group of serially connected float modules 100 is towed by a tug 400 on the water surface to an assembly location. The float modules may be connected and towed by the same towing line 402. At the assembly location, the vertical height between the seabed 404 and the water surface is sufficient to complete the assembly of an entire floating support structure 300 while in a submerged condition. Once at the assembly location, the tug 400 is retained in position against the effects of current and wind by an anchor line 406 and anchor 408. Alternatively, dynamic positioning may be utilised to keep the vessel in a predetermined location. During the assembly as shown in FIG. 8, the controllable float modules 100 have been 'ballasted' via remote control into a condition of neutral buoyancy, for example, by utilising fluid lines that are connected to auxiliary pumps, compressors or similar equipment on the tug 400. Alternatively, the required equipment may be integral to, or temporarily attached to the controllable float modules 100. When the float modules are in the state of neutral buoyancy, the float modules 100 are submerged in a controlled manner to a depth where the effects of surface waves are negligible. Here, the float modules 100 are connected to form a minor sub-assembly 202. Again, the remotely controllable float modules 100 can be assembled remotely, i.e. without the need for divers, and are retained by and connected to the tug 400 by lines 402. As shown in FIG. 9, a group of minor sub-assemblies 202 is connected together for instance by a locking system or tensioned fasteners (see FIG. 5) so as to form a major sub-assembly 204. The major sub-assembly 204 is then retained in position by lines 402 that are connected to the tug 400. A buoy 410 may also be connected to the sub-assembly 204 to enable further connection to be made from the water surface by lines to other major sub-assemblies, which are then also ballasted and submerged. Referring now to FIG. 10, two major sub-assemblies 204, both in neutral buoyancy condition, are being connected together.

Figure 16:
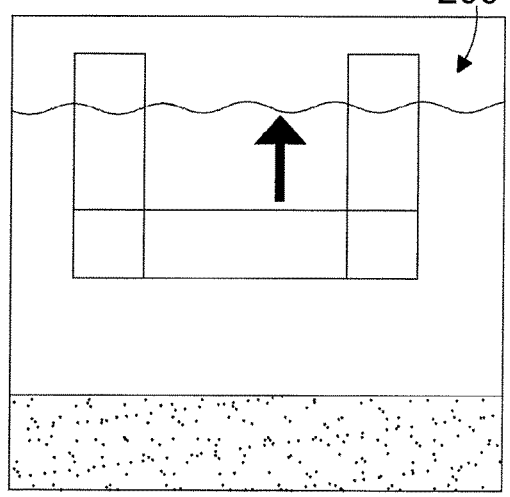
FIG. 16 shows the assembled support structure that is "de-ballasted", (i.e. buoyancy characteristics of one or more major sub-assemblies is varied) to move at least part of the support structure above water surface.
Figure 17:
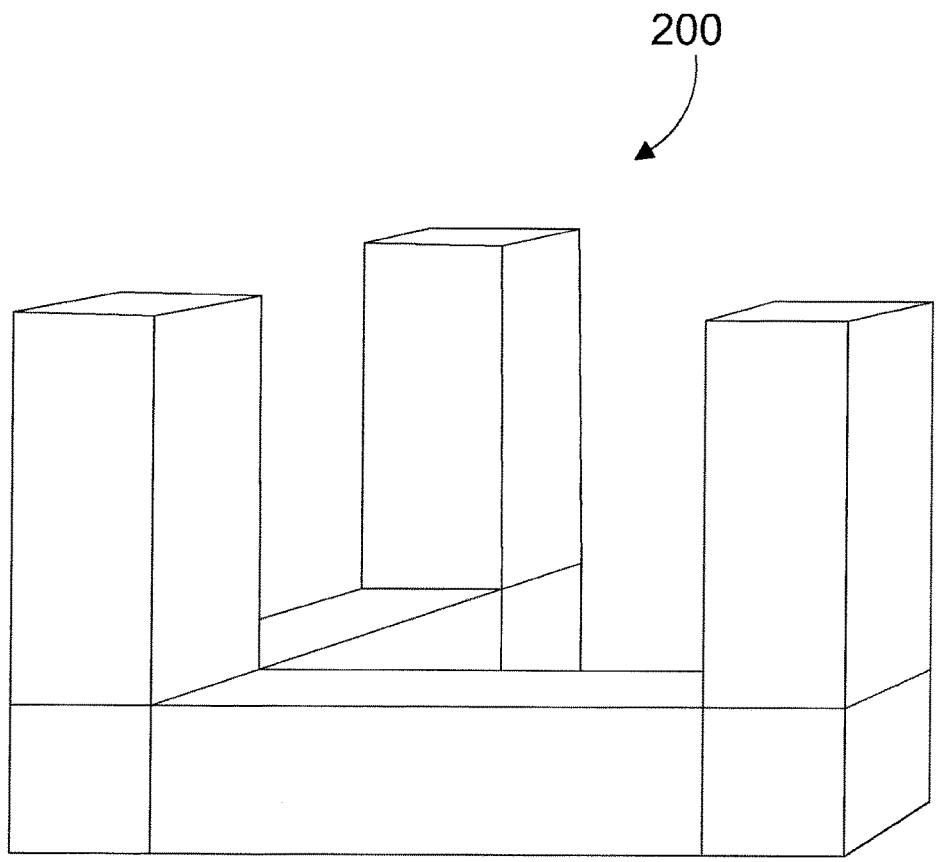
FIG. 17 shows an isometric view of an assembled support structure comprising columns, link members and nodes (major sub-assemblies of a plurality of controllable float modules)

Referring now to FIGS. 11 to 16, an example sequence of assembling a floating support structure 300 is illustrated. First, two major sub-assemblies are forming node 206 and column 208 while the orientation of the axis of the column 208 and node 206 is parallel to the water surface. Next, respective sections of the plurality of controllable float modules 100 of the node 206 are ballasted (i.e. buoyancy characteristics of respective sections of the float modules 100 are changed) to orient the node 206 and column 208 in an upright position. The column 208 and node 206 are then brought into a neutral buoyancy condition while in the upright orientation (i.e. the longitudinal axis is perpendicular to the water surface). A link member 210 (i.e. another major sub-assembly) is then connected to the column 208 and the node 206. The connection may be made, for example, using line 402, while all pieces remain in a neutral buoyancy condition below the water surface and above the seabed 404. Another column 208 and node 206 are then connected to the other end of the link member 210 to form a floating support structure assembly 200. The neutral buoyant floating support structure 200 may then be de-ballasted (again, by changing the buoyant characteristics of respective sections of some float modules 100) as shown in FIG. 16. A perspective view of an example embodiment of the floating support structure 200 is shown in FIG. 17.

Figure 18:
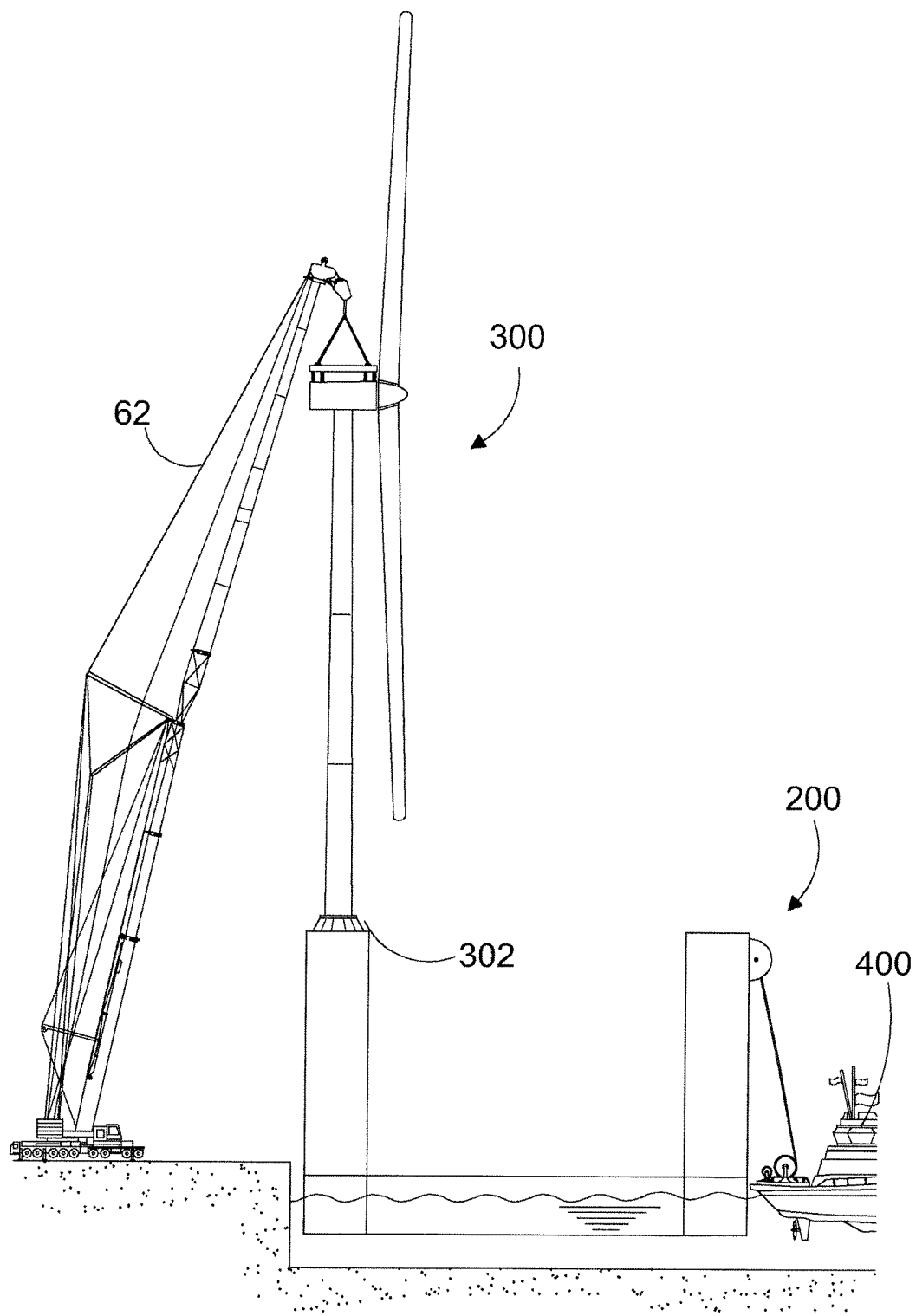
FIG. 18 shows an illustration of an assembled support structure that is "de-ballasted" to allow positioning in shallow water during fitting of a wind turbine generator.
Figure 19:
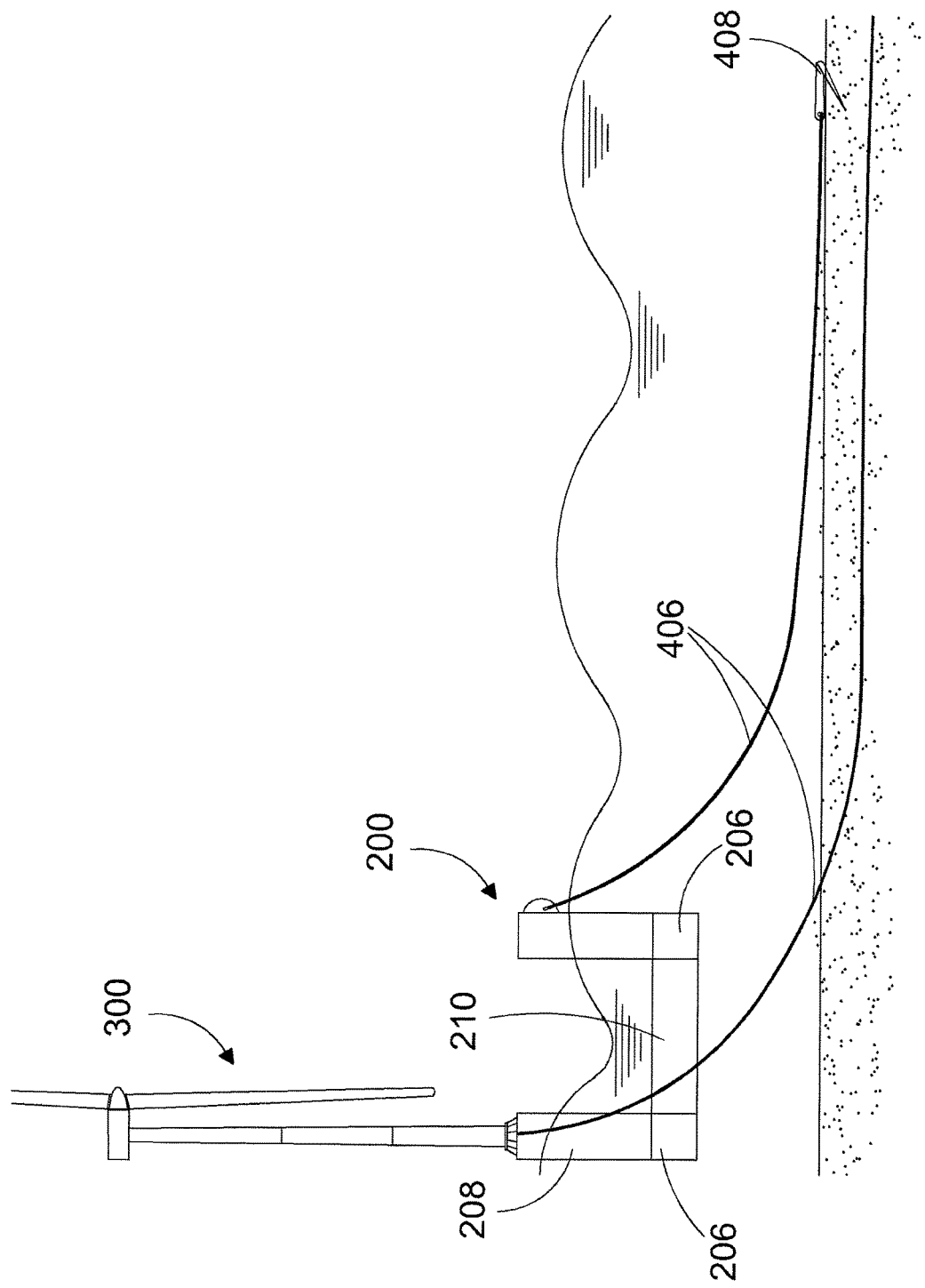
FIG. 19 shows the assembled support structure of FIG. 18 with an attached wind turbine generator that is anchored at its offshore operating location.

FIG. 18 illustrates steps 22 and 24, where the floating support structure 200 is 'de-ballasted' so as to provide sufficient clearance below the underside and the seabed 404 or riverbed or any soil surface, and moored alongside a quayside. A mobile heavy lift crane 62 is used to complete the assembly by attaching a wind turbine generator 300 on to a transition piece 302. During the assembly of a heavy piece of equipment, such as, for example, the wind turbine generator 300, the variable buoyancy characteristics of the float modules 100 are used as and adaptive ballasting system within the floating structure 200, allowing to correct the effects of centre of gravity and meta-centric height effects, and retain an acceptable trim for the combined floating support structure 200 and fitted equipment 300. The completed floating support structure 200 fitted with a wind turbine generator 300 is then moved to an offshore location to start its energy generating operation. Anchor cables 406 are connecting the floating support structure 200 to anchors 408 to react wind loads and current loads.

To ensure the correct and optimal orientation of the wind turbine generator 300, the link members 210 and nodes 206 are fully submerged, wherein the columns 208 of the floating support structure 200 operate as a semi-submersible vessel, so as to minimise the motion effects of waves and swell.

Figure 20:
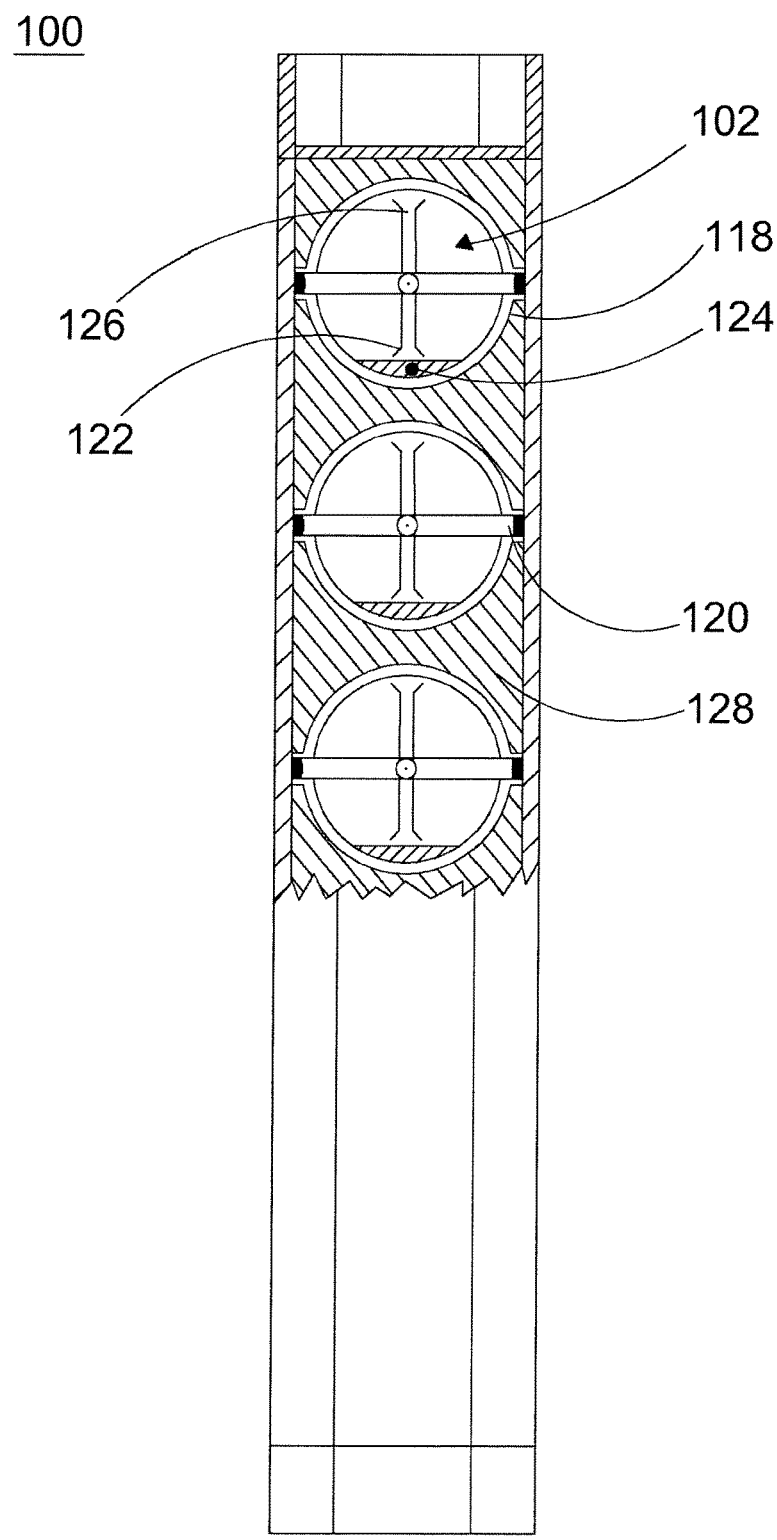
FIG. 20 shows a partly cross-sectioned front view of a first example embodiment of the controllable float module of the present invention.

Referring now to FIG. 20, an example embodiment of the controllable float module 100 is shown. In this embodiment, the float module 100 comprises spherical buoyancy tanks 102 (also called ballast chambers). Each of the buoyancy tanks 102 is mounted within a gimble-frame 118. The gimble-frame 118 pivotably supports the buoyancy tank 102 utilising bearings that carry hollow tubes 120 through which fluid can be transferred. The fluid tube 120 is further connected to a fluid suction port 122. The buoyancy tank 120 and fluid suction port 122 are kept in the same orientation by a weight 124. Also, the gimble-frame 118 provides sufficient freedom of movement to retain the centre of gravity of the weight 124 vertically below the line of intersection of the two gimble-frame axes. Furthermore, the gimbles 118 allow the float module 100 to have a separate motion and orientation to that of the buoyancy tank 102.

During use, the water may be extracted in any orientation of the float module 100. A separate fluid reservoir (e.g. air) may be connected to a second fluid port 126 through a hollow support shaft. The float module 100 may also comprise fixed buoyancy members 128 that are provided in the space that is not occupied by the buoyancy tanks 102. The fixed buoyancy members 128 provide the float module with an inherent buoyancy characteristic. By filling and emptying the buoyancy tanks 102 the buoyancy characteristics of specific sections of the float module 100 may be changed, for example from a floating buoyant condition (positive) to a neutral buoyancy condition, or to a sinking buoyant condition (negative).

Figure 21:
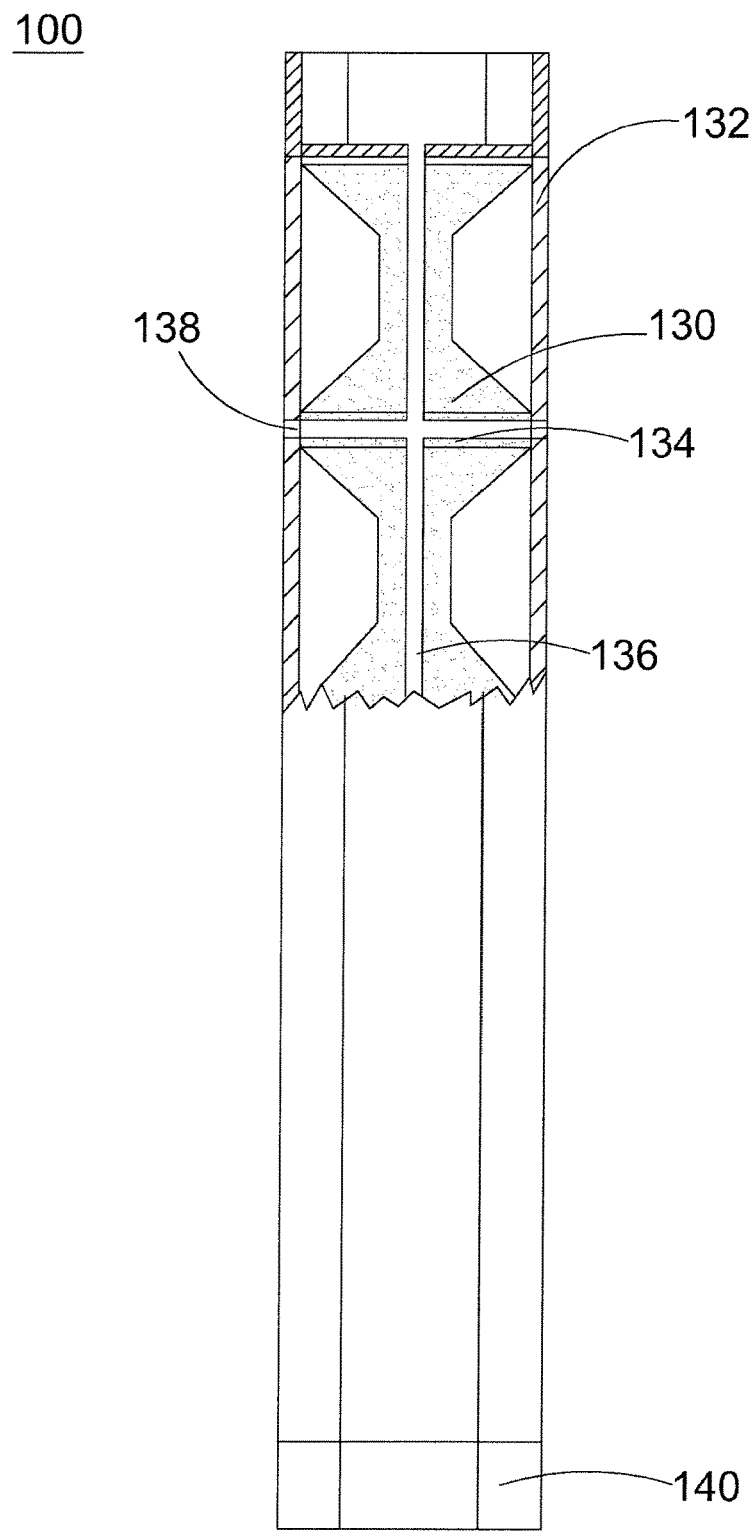
FIG. 21 shows a partly cross-sectioned front view of a second example embodiment of the controllable float module of the present invention.

FIG. 21 shows a different example embodiment of the float module 100, where the buoyancy tanks 102 are created in the annular space between a central spool piece 130 and an outer casing 132 (e.g. a fluid-tight container). The spool piece 130 is circular in cross-section and has O-rings 134 fitted into grooves, so as to seal the buoyancy tanks 102. The spool piece 130 has predetermined ratios of dimensions in order to create effective struts with a high resistance to buckling when the float module 100 is connected end-to-end with other float modules 100, e.g. by a tie-bar or tensioning cable through the bore 136. The connection of float modules 100 in side-face-to side-face orientation is effected by passing a tie-bar or tensioning cable through the bore 138. The float module's 100 structural end caps 140 may contain connectors and any control equipment (not shown) to allow the distribution of air or liquids (water) to selectively fill and empty any one of the ballast chambers 102, therefore controlling the buoyancy characteristics of at least a portion of the float module 100, and allowing the orientation of the float module 100 to be controlled.

Figure 22:
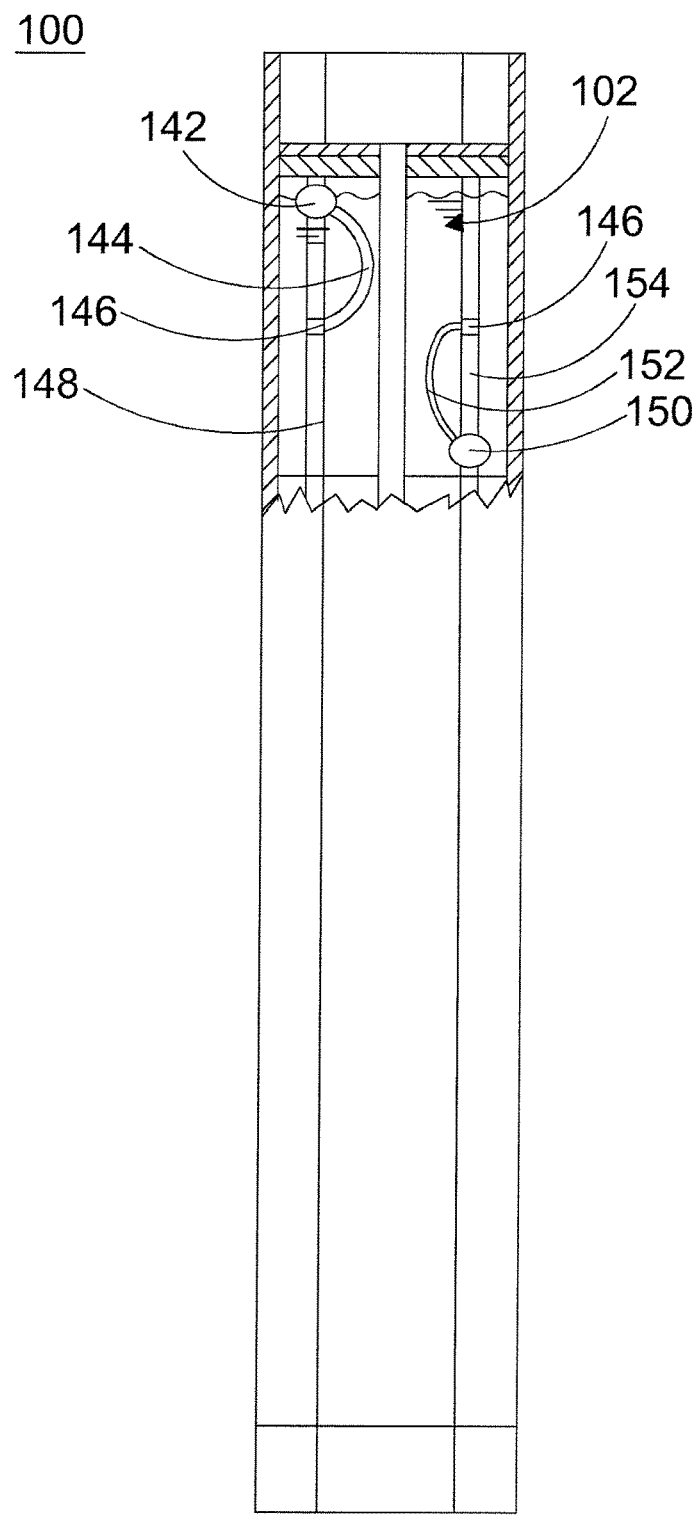
FIG. 22 shows a partly cross-sectioned front view of a third example embodiment of the controllable float module of the present invention.

FIG. 22 shows another example embodiment of the float module 100 of the present invention. Ballast chambers 102 are provided in predetermined locations within the float module 100. A floating fluid port 142 is provided to transport or extract, for example, air from a fluid reservoir into the ballast chamber 102 (i.e. to replace any higher-density liquid, such as water). The floating fluid port 142 is connected to a flexible fluid connection (hose) 144 and to a valve block 146 that is attached to a rigid pipe 148, i.e. the fluid main. This mechanism ensures that the air fluid port 142 is always located on top of the water, irrespective of the orientation of the float module 100. Furthermore, a weighted suction strainer 150 is connected to a flexible hose 152 and to a valve block 146 that is attached to a rigid pipe 154 that provides the main connection to the water reservoir (i.e. the higher-density ballast). As mentioned earlier, the separate float fluid port 142 and weighted suction strainer port 150 provide a mechanism that allows the respective fluid ports 142, 150 to be maintained in a predetermined location with respect to the ballast water surface contained in the ballast chamber 102. I.e. the float module can be moved in any orientation within a three dimensional space and the floating fluid port 142 will always float to the uppermost position on the tank liquid surface. The weighted suction strainer 150 will always sink to the lowest position in the ballast chamber 102 so as to enable the maxim amount of liquid to be extracted, and to optimise the buoyancy contribution of each one of the individual ballast chambers 102.

Figure 23:
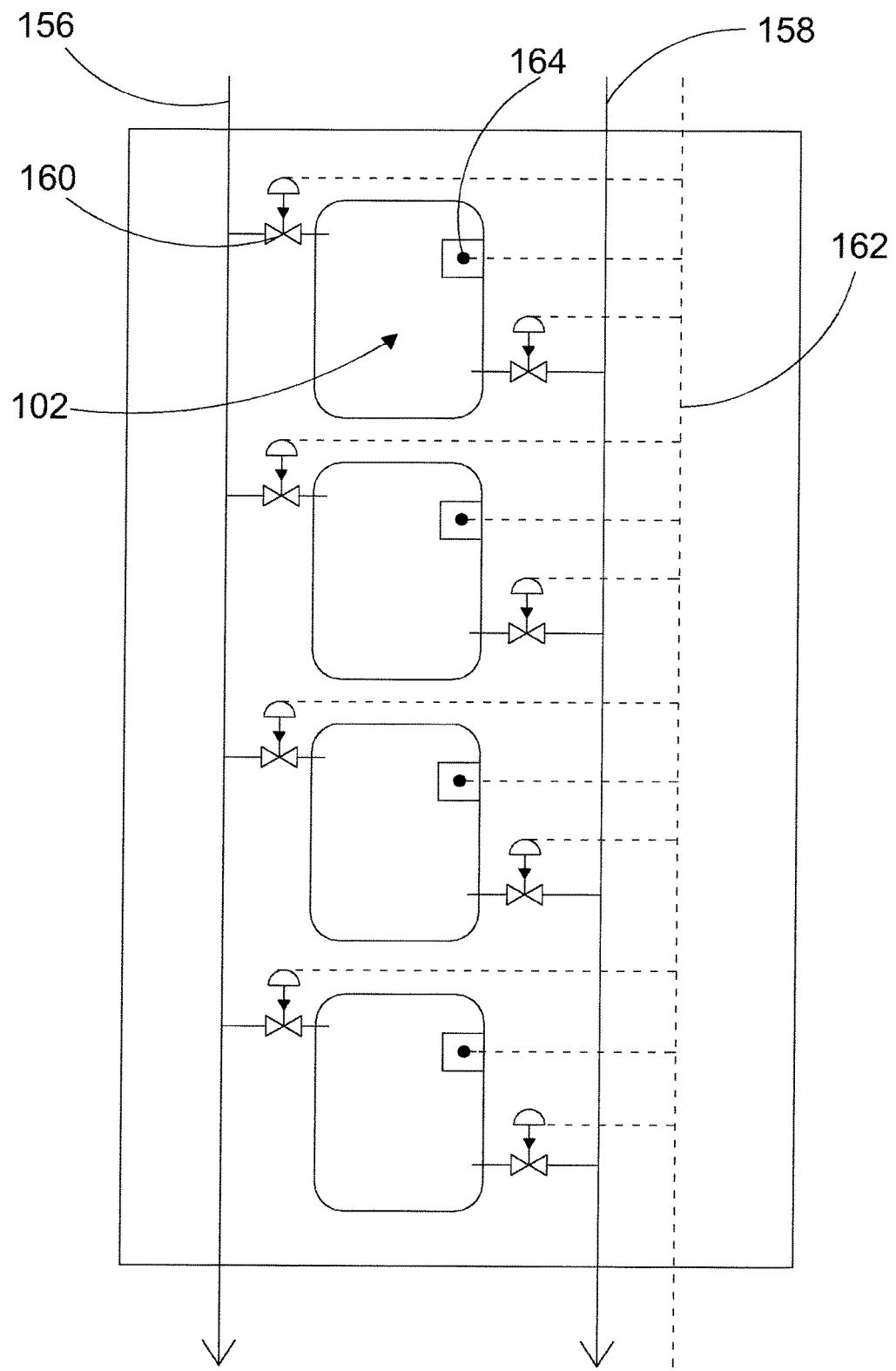
FIG. 23 shows a simplified functional diagram of the controllable float module, including ballast chambers, fluid connections, remotely actuatable control valves and sensors.

A simplified schematic diagram is shown in FIG. 23 to describe the operation of a controllable float module 100 in more detail. Here, fluid mains 156 and 158 provide fluids of different densities (e.g. water and air) to the ballast chambers 102 and other float modules 100 that may be operatively coupled to this float module 100 to form a minor sub-assembly 202 or a major sub-assembly. The fluid mains 156, 158 may be fed from a floating vessel, or the fluid reservoirs may be integrally installed or attached pressure vessels or accumulators during partial or full-submerged construction. Remotely controllable valves 160 are adapted to open and close a fluid passageway (in response to a control signal received by, for example, a control system), therefore, selectively allowing different density fluids (e.g. water, air) to be admitted into or extracted from the ballast chamber 102. By selectively controlling the proportion of different density fluids (e.g. water, air) within the ballast chamber 102, the overall buoyancy of that ballast chamber can be controlled (i.e. selectively varied), further allowing to control the orientation of the float module 100 or any sub-assembly 202, 204 when submerged.

Each of the control valves 160 may be controlled separately via a control signal distribution system 162. Sensors 164 may be provided anywhere within the float module 100 (e.g. within the ballast chamber 102), and which are adapted to transmit signals to, for example, a control system (not shown) to provide information on the current orientation, the depth below the water surface, the fluid levels within each one of the ballast chambers 102, and/or a connection integrity status between a first float module 100 and operatively coupled other float modules 100 (sub-assemblies).

Figure 24:
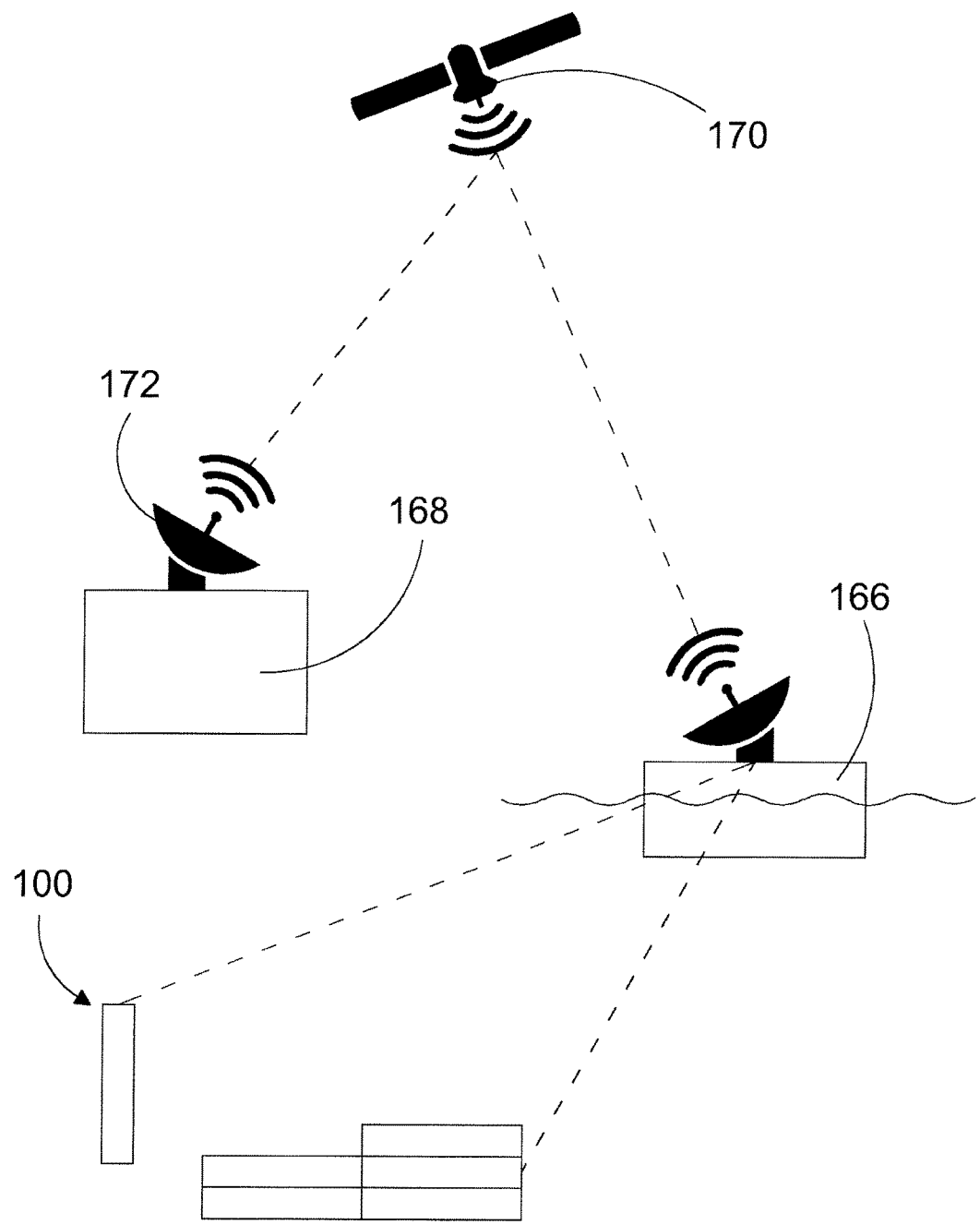
FIG. 24 shows an illustration of a wireless signal path of the control signal from a remote location to respective controllable float modules.

FIG. 24 shows an example signal path when utilising a remote control system to control the buoyancy of each or any one of the controllable float modules 100. The remote control may be effected from a surface vessel 166 that is positioned relatively close to the float module(s) 100 or from any other remote location, such as, for example, a land-based control centre facility 168. A control system is adapted to control any of the valves 160 that are integral within the float module 100 in accordance with control signals received from any of the remote locations. Long distance remote control may be effected by utilising a satellite communications system 172 where control and monitoring signals are transmitted and received via orbiting communications satellites 170. Also, the control system may include a Virtual Reality system or Augmented Reality system provided at a remote location, that is adapted to allow a user to control the assembly of the offshore support structure by simply moving virtual components in the virtual reality environment, The Virtual Reality or Augmented Reality system will then generate suitable control signals that are transmitted to any or all of the float module 100 control system(s) to effect the required movement. Also, any sensor data may be sent to and incorporated (i.e. processed) into the Virtual Reality/Augmented Reality system to provide the user with real-time feedback during (virtual and real) assembly.

It will be appreciated by persons skilled in the art that the above embodiment(s) have been described by way of example only and not in any limitative sense, and that various alterations and modifications are possible without departing from the scope of the invention as defined by the appended claims.

The invention claimed is:

1. A controllable float module for a modular offshore support structure assembly, comprising:
   a first ballast chamber provided within a predetermined first portion of said float module, having at least one first controllable fluid connection, adapted to provide controlled fluid flow between an interior of said first ballast chamber and a first fluid reservoir containing a first fluid, and at least one second fluid connection, adapted to provide controlled fluid flow between said interior of said first ballast chamber and a second fluid reservoir containing a second fluid;
   at least one second ballast chamber provided within a predetermined second portion of said float module, having at least one first controllable fluid connection, adapted to provide controlled fluid flow between an interior of said second ballast chamber and said first fluid reservoir containing said first fluid, and at least one second fluid connection, adapted to provide controlled fluid flow between said interior of said second ballast chamber and said second fluid reservoir containing said second fluid;
   a control system, adapted to control each of said at least one first and second controllable fluid connection and selectively vary the proportional quantity of said first fluid and said second fluid within any one of said first and at least one second ballast chamber, so as to selectively vary the buoyancy of any one of said at least one predetermined first and second portion of said float module when in use;
   wherein each of said at least one controllable fluid connection comprises a first fluid port mechanism, operatively coupled to respective one of said first and said at least one second ballast chamber, and adapted to maintain a predetermined first orientation with respect to the gravitational field of the earth irrespective of the orientation of said float module, and
   wherein each of said at least one second controllable fluid connection comprises a second fluid port mechanism, operatively coupled to respective one of said first and said at least one second ballast chamber, and adapted to maintain a predetermined second orientation with respect to the gravitational field of the earth irrespective of the orientation of said float module.

2. A controllable float module according to claim 1, further comprising a fluid-tight first container configured to encase said first and at least one second ballast chamber.

3. A controllable float module according to claim 2, wherein said fluid-tight container is made of a buoyant material.

4. A controllable float module according to claim 2, wherein said container comprises at least one connector mechanism, adapted to operatively couple said float module to at least one other float module.

5. A controllable float module according to claim 1, wherein each one of said at least one first controllable fluid connection and said at least one second controllable fluid connection comprises any one or any number of at least one control valve, at least one fluid pump, at least one vent and at least one fluid filter, each actuatable by said control system.

6. A controllable float module according to claim 1, wherein said first ballast chamber and said at least one second ballast chamber are fluidly coupleable, so as to allow selective fluid exchange between said first ballast chamber and any one of said at least one second ballast chamber.

7. A controllable float module according to claim 1, comprising a plurality of said first and/or at least one second ballast chamber, each provided within a predetermined portion of said float module.

8. A controllable float module according to claim 1, further comprising at least one sensor operatively coupled to said float module and adapted to detect and/or monitor at least one physical property of said float module.

9. A controllable float module according to claim 1, wherein any one of said first and said second fluid reservoir is located exterior to said float module.

10. A controllable float module according to claim 1, wherein any one of said first and said second fluid reservoir is an integral part of said float module.

11. A controllable float module according to claim 1, wherein said control system is adapted to receive and transmit at least one control signal adapted to affect said float module into at least one first position and/or orientation when in use.

12. A controllable float module according to claim 11, wherein said control system is adapted to receive and transmit wireless control signals.

13. A controllable float module according to claim 11, wherein said at least one control signal is any one of an electrical signal, a pneumatic signal, a hydraulic signal, an optical signal, an electromagnetic wireless signal and a sonic signal.

14. A controllable float module according to claim 1, wherein the density of said first fluid is higher than the density of said second fluid.

15. A controllable float module according to claim 1, wherein said first fluid is a liquid and said second fluid is a gas.

16. A controllable float module according to claim 1 wherein said second fluid is a pressurised gas.

17. A controllable float module according to claim 1, further comprising a power source adapted to supply power to said float module.

18. A controllable float module according to claim 17, wherein said power source is an external power supply operatively coupleable to said float module.

19. A controllable float module according to claim 17, wherein said power source is an energy storage system operatively coupled to said float module.

20. A modular offshore support structure assembly, comprising at least one controllable float module according to claim 1.

21. A modular offshore support structure assembly according to claim 20, comprising a plurality of said float modules adapted be assembled into a plurality of predetermined shapes.

22. A modular offshore support structure assembly according to claim 21, further comprising a user interface adapted to provide remote assembly of said modular offshore support structure assembly.

23. A method for assembling a modular offshore support structure according to claim 20, comprising the steps of:
 (a) moving a plurality of modular float modules to a predetermined offshore location;
 (b) varying buoyancy characteristics of at least a portion of any one of said plurality of modular float modules so as to move any one of said plurality of modular float modules into a desired position and/or orientation;
 (c) operatively couple any one of said plurality of modular float modules to any other one of said plurality of modular float modules.

* * * * *